United States Patent
Carl et al.

(10) Patent No.: US 10,358,583 B2
(45) Date of Patent: Jul. 23, 2019

(54) ADHESIVE COMPOSITION AND ADHERED ROOFING SYSTEM PREPARED USING THE ADHESIVE COMPOSITION

(71) Applicant: SIKA TECHNOLOGY AG, Baar (CH)

(72) Inventors: Wilfried Carl, Wädenswil (CH); Markus Haufe, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/629,236

(22) Filed: Jun. 21, 2017

(65) Prior Publication Data
US 2018/0010021 A1   Jan. 11, 2018

(30) Foreign Application Priority Data
Jul. 7, 2016 (EP) .................................. 16178418

(51) Int. Cl.
*C09J 107/00* (2006.01)
*C09J 111/00* (2006.01)
*C09J 109/02* (2006.01)
*C08L 101/14* (2006.01)
*B32B 7/12* (2006.01)
*C09J 5/04* (2006.01)
*C09J 109/00* (2006.01)
*C09J 115/02* (2006.01)
*C09J 121/00* (2006.01)
*E04D 5/14* (2006.01)

(52) U.S. Cl.
CPC ............... *C09J 107/00* (2013.01); *B32B 7/12* (2013.01); *C08L 101/14* (2013.01); *C09J 5/04* (2013.01); *C09J 109/00* (2013.01); *C09J 109/02* (2013.01); *C09J 111/00* (2013.01); *C09J 115/02* (2013.01); *C09J 121/00* (2013.01); *E04D 5/148* (2013.01); *B32B 2419/06* (2013.01)

(58) Field of Classification Search
CPC ...... C09J 107/00; C09J 111/00; C09J 109/02; B32B 7/12; B32B 2419/06; C08L 101/14
See application file for complete search history.

(56) References Cited

U.S. PATENT DOCUMENTS

| | | | |
|---|---|---|---|
| 4,386,981 A | 6/1983 | Clapperton | |
| 4,595,636 A | 6/1986 | Wiercinski et al. | |
| 4,600,635 A | 7/1986 | Wiercinski et al. | |
| 2005/0256254 A1* | 11/2005 | Luhmann | C09J 153/02 524/555 |
| 2007/0060855 A1* | 3/2007 | Leung | A61L 15/225 602/41 |

FOREIGN PATENT DOCUMENTS

| | | |
|---|---|---|
| WO | 2014159798 A1 | 10/2014 |
| WO | 2015074031 A1 | 5/2015 |

OTHER PUBLICATIONS

Nov. 11, 2016 Search Report issued in European Patent Application No. 16 17 8418.

* cited by examiner

*Primary Examiner* — Robert D Harlan
(74) *Attorney, Agent, or Firm* — Oliff PLC

(57) ABSTRACT

The invention is directed to an adhesive composition including at least one rubber component, a solvent, and at least one powdered superabsorber polymer. The invention also relates to a method for bonding a roofing membrane to a substrate using the adhesive composition as a contact adhesive, to fully adhered membrane roofing system, and to the use of adhesive composition for adhering roofing membranes to substrates by contact bonding.

9 Claims, No Drawings

ADHESIVE COMPOSITION AND ADHERED ROOFING SYSTEM PREPARED USING THE ADHESIVE COMPOSITION

TECHNICAL FIELD

The invention relates to the field of solvent-based contact adhesives and adhered roofing systems prepared with the adhesive.

BACKGROUND OF THE INVENTION

In the field of construction, polymeric sheets, which are often referred to as membranes or panels, are used to cover flat and low-sloped roofs. Commonly used materials for membranes include thermoplastics such as plasticized polyvinylchloride (p-PVC), thermoplastic olefins (TPE-O, TPO), and elastomers such as ethylene-propylene diene monomer (EPDM). Such membranes are typically delivered to a construction site in rolls, transferred to the place of installation and unrolled and positioned. The roof substrate on which the membrane is adhered may be comprised of variety of materials depending on the installation site. The roof substrate may be e.g. a concrete, metal, or wood deck, or it may include an insulation board or recover board and/or an existing membrane.

The membranes are secured to the roof substrate to provide sufficient mechanical strength to resist the shearing forces applied on it e.g. due to high wind loads. In addition to securing the membrane to the substrate, the edges of adjacent membranes are overlapped and the overlapping portions are heat welded or bonded to each other to create a waterproof seal. The technique for bonding the overlapped portions of the membranes depends on the materials of the membrane and roof substrate, typically the seams are sealed using adhesives, adhesive tapes or by heat-welding. The membrane can be mechanically fastened to the roof substrate using screws and barbed plates.

Mechanical fastening enable high strength bonding but they provide direct attachment to the roof substrate only at locations where a mechanical fastener affixes the membrane to the surface, which makes mechanically attached membranes susceptible to flutter.

Membranes can also be secured to the roof substrate by adhesive attachment, which allows the formation of fully adhered roofing system. In this case the majority, if not all, of the membrane is secured to the roof substrate. Fully adhered roofing systems can be prepared by using a number of techniques. Typically a contact bonding method is employed, in which both the membrane and the surface of the roof substrate are coated with a solvent or water based contact adhesive after which the membrane is contacted with the surface of the substrate. The volatile components of the contact adhesive are "flashed off" to provide a partially set adhesive prior to contacting the membrane with the substrate.

According to another technique, fully adhered roofing system is prepared by using membranes having a pre-applied adhesive layer on the bottom of the membrane. In this case, the membrane is provided to the construction site containing a pre-applied layer of adhesive covered with a release liner. At the time of use the release liner is removed and the membrane is secured to the substrate without using additional adhesives. Membranes having a pre-applied adhesive layer covered by release liner are known as peel and stick membranes. In fully adhered roofing systems the seams between overlapping parts of adjacent membranes can be adjoined by using the same or different adhesive as for membrane bonding, by using sealing tapes or by heat welding.

Fully adhered roofing systems provide certain advantages over mechanically fastened systems including easy installation and high bond strength between the membrane and the roof substrate. Adhesive based bonds are, however, sensitive to thermal and moisture degradation. Normally the adhesive bond is in contact with only minor amount of moisture since the membrane protects the below roofing structures against water penetration. However, even a minor breach in the membrane will allow significant amount of water into the system. Such damages in the membrane may be generated by extensive traffic across the roof surface storing of heavy equipment on the roof e.g. during façade cleaning.

Once the damage is discovered, the repair of the membrane typically consists of patching the opening and thereby leaving the moisture trapped in the system. In a typical system, the trapped moisture will degrade the adhesive bond and/or the cohesive strength of the top surface of the insulation or cover board below causing localized delamination of the assembly and making the roof susceptible to significant damage under wind load. One of the disadvantages of the state-of-the-art adhered roofing systems is that the layer of adhesive is exposed to moisture degradation in case of leaking membrane causing localized delamination under high wind loads.

SUMMARY OF THE INVENTION

The object of the present invention is to provide an adhesive composition, which solves the aforementioned prior art problems, when used for adhering thermoplastic roofing membranes to roof substrates.

Another object of the present invention is to provide a fully adhered membrane roofing system, which is able to prevent water from migrating to the roofing structure even in case of damaged membrane.

The main concept of the invention is that the adhesive composition comprises in addition to the typical components of a solvent based contact adhesive at least one powdered superabsorber polymer.

The adhesive composition of the present invention can be used as a contact adhesive for bonding roofing membranes to substrates. The terms "contact adhesive" and "bond adhesive" are used interchangeable and refer to a type of adhesive used in contact bonding method.

It has been surprisingly found that the adhesive composition of the present invention provides significantly improved resilience against humidity ageing also at elevated temperatures, which provides a significant advantage over the state-of-the-art bond adhesives used in fully adhered roofing systems.

According to another aspect of the present invention, a method for forming a fully adhered membrane roofing system is provided.

It has been surprisingly found that the adhesive composition of the present invention acts in a fully adhered roofing system as a moisture buffer, which absorbs condensate moisture during cold months and releases the absorbed moisture when the roofing structure dries out at summer. Since the condensate moisture is immediately absorbed by the layer of adhesive, the surface of the membrane layer, metallic parts such as fixation screws and thermal insulation are not exposed to the moisture, which typically causes corrosion, mold growth and decrease of effectiveness of thermal insulation.

According to still another aspect of the present invention, a fully adhered membrane roofing system is provided.

DETAILED DESCRIPTION OF THE INVENTION

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "room temperature" designates a temperature of 23° C.

The term "rubber" designates a natural, synthetic, or modified high polymer component with elastic properties. The term "elastomer" may be used interchangeably with the term "rubber".

The term "organic solvent" refers to non-aqueous solvents and combinations of non-aqueous solvents, and, in particular, to solvents comprising organic compounds.

The term "superabsorber polymer" or "super absorbent polymer" refers to special class of polymers that can absorb and retain extremely large amounts of a liquid relative to their own mass. For example, such superabsorber polymers may be able to absorb up to 300 times its weight (from 30 to 60 times its own volume) of water.

The present invention relates in a first aspect of the invention to an adhesive composition comprising:
a) at least one rubber component,
b) at least one organic solvent, and
c) at least one powdered superabsorber polymer, wherein the total amount of powdered superabsorber polymers is 0.5-10.0% by weight, based on the total weight of the adhesive composition.

The type of superabsorber polymer used in the adhesive composition is not particularly restricted. Suitable powdered superabsorber polymers include known homo- and co-polymers of (meth)acrylic acid, (meth)acrylonitrile, (meth)acrylamide, vinyl acetate, vinyl pyrrolidone, maleic acid, maleic anhydride, itaconic acid, itaconic anhydride, vinyl sulfonic acid or hydroxyalkyl esters of such acids, wherein 0-95% by weight of the acid groups have been neutralized with alkali or ammonium groups and wherein these polymers/copolymers are crosslinked by means of polyfunctional compounds.

Suitable superabsorber polymers are commercially available from BASF(HySorbe), Evonik (FAVOR®), and Nippon Shokubai (AQUALIC® CA).

The absorption capacity of the adhesive in dried form is basically directly proportional to the amount of powdered superabsorber polymer in the adhesive composition. It was, however, found that too high amounts of superabsorber polymer results in delamination of the membrane in humidity ageing tests due excessive swelling of the adhesive film. The total amount powdered superabsorber polymers in the adhesive composition is 0.5-10.0% by weight, preferably 1.0-6.0% by weight, most preferably 2.0-6.0% by weight, based on the total weight of the adhesive composition.

The particle size of the powdered superabsorber polymer is not particularly restricted. Preferably, the powdered superabsorber polymer has a median particle size d50 of less than 500 μm, more preferably less than 400 μm, most preferably less than 100 μm. The term median particle size d50 refers to a particle size below which 50% of all particles by volume are smaller than the d50 value.

The term "particle size" refers to the area-equivalent spherical diameter of a particle. The particle size distribution can be measured by laser diffraction according to the method as described in standard ISO 13320:2009. A Mastersizer 2000 device (trademark of Malvern Instruments Ltd, GB) can be used in measuring particle size distribution.

According to one or more embodiments, the adhesive composition is solvent-based solution adhesive. The term "solvent-based solution adhesive" refers here to an adhesive composition, wherein the adhering polymer is dissolved in the solvent. Accordingly, in the adhesive composition of the present invention, the at least one rubber component is preferably substantially completely dissolved in the organic solvent. By the wording "substantially completely dissolved" is meant that at least 95.0% by weight, preferably at least 99.0% by weight, most preferably at least 99.9% by weight of the rubber component is dissolved in the organic solvent.

Preferably, the total amount of rubber components in the adhesive composition is 5.0-60.0% by weight, more preferably 10.0-50.0% by weight, most preferably 10.0-30.0% by weight, based on the total weight of the adhesive composition.

The adhesive composition of the present invention is preferably a solvent based contact adhesive and, therefore, substantially water-free. Preferably, the adhesive composition contains less than 10.0% by weight, more preferably less than 5.0% by weight, most preferably less than 1.0% by weight of water, based on the total weight of the adhesive composition. Solvent based contact adhesives have been found be advantageous in the present invention since they provide sufficient peel strength in fully adhered membrane roofing systems and since they can be easily mixed with powdered superabsorber polymers to enable sufficient moisture absorbing properties.

The amount and type of the organic solvents in the adhesive composition is not particularly restricted and they are typically selected based on the type and amount of rubber components contained in the adhesive composition. Suitable organic solvents may have a boiling point that is not above 250° C., in particular not above 200° C., preferably not above 150° C.

According to one or more embodiments, the total amount of organic solvents is 50.0-90.0% by weight, preferably 55.0-85.0% by weight, most preferably 60.0-85.0% by weight, based on the total weight of the adhesive composition.

The preferred organic solvents for the adhesive composition are aliphatic and aromatic hydrocarbon solvents and mixtures thereof. Preferably, the at least one organic solvent is selected from the group consisting of toluene, xylene, hexane, octane, and mixtures thereof. Furthermore, in addition to aforementioned solvents, oxygenated solvents such as ethyl acetate, acetone, tetrahydrofuran, methyl ethyl ketone, and other ketone and ester based solvents, may be contained in the adhesive composition up to 25% by weight of the total weight of solvents.

The at least one rubber component is preferably selected from the group consisting of chloroprene rubber, butyl rubber, halogenated butyl rubber, acryl nitrile rubber, natural rubber, polyurethane rubber, or any other suitable rubber or rubber mixture familiar to a person skilled in the art in the field of solvent-based contact adhesives.

According to one or more embodiments, the adhesive composition further comprising at least one hydrocarbon resin and/or a synthetic thermosetting resin, and/or adhesion promoter.

Examples of suitable hydrocarbon resins include aliphatic hydrocarbon resins, at least partially hydrogenated aliphatic hydrocarbon resins, aromatic hydrocarbon resins, at least partially hydrogenated aromatic resins, aliphatic/aromatic hydrocarbon resins, at least partially hydrogenated aliphatic/aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

Suitable synthetic thermosetting resins to be used in the adhesive composition include those materials obtained by the condensation of phenol or substituted phenol with an aldehyde. These materials may also be referred to as phenolic resins.

Suitable adhesion promoters include polyolefins, in particular functionalized polyolefins. As is known in the art, the polyolefins may derive from ethylene or α-olefins such as, but not limited to, propylene, butene, pentene, and octene. In particular embodiments, the polyolefin includes isotactic polypropylene. In other embodiments, copolymers of propylene and comonomers such as ethylene and/or octene are contemplated.

In one or more embodiments, the adhesive composition further comprises one or more additives selected from reinforcing and non-reinforcing fillers, antioxidants, stabilizers, pigments, and flame retardants. Suitable fillers that can be used include inorganic fillers such as calcium carbonate, clays, silica, talc, titanium dioxide, magnesium oxide, zinc oxide, carbon black, and mixtures thereof.

The present invention relates in another aspect of the invention to a method for bonding a roofing membrane to a substrate, comprising:

i) Applying an adhesive composition of the present invention to at least portion of a planar surface of the membrane to form a continuous wet film of adhesive, ii) Applying an adhesive composition of the present invention to at least portion of the planar surface of the substrate to form a continuous wet film of adhesive, iii) Allowing the solvent contained in the wet adhesive films to at least partially evaporate to form adhesive films suitable for contact bonding, iv) Mating the membrane to the substrate by contacting the two adhesive films.

The adhesive composition may be applied on the surfaces by any conventional method such as by using manual rollers or brushes, in which case the roller/brush is dipped into the adhesive composition. The adhesive compositions may also be applied by using power rollers, drop spreaders, squeegee, or by spraying.

Preferably, the adhesive composition is applied in steps i) and/or step ii) by dip and roll techniques/roller, by brush, by squeegee, or by spraying.

In preparing a fully adhered membrane roof system, the adhesive composition is preferably applied to the membrane to form a wet film over a substantial portion of the planar surface of the roofing membrane. Preferably, the adhesive composition is applied over at least 50%, preferably at least 70%, more preferably at least 80%, most preferably at least 90% of the planar surface of the roofing membrane.

The roofing membrane may be any polymeric membrane typically used as a roofing membrane. Preferably, the roofing membrane comprises at least one thermoplastic or elastomeric polymer, preferably selected from the group consisting of polyvinylchloride (PVC), propylene diene rubber (EPR, EPDM), ethylene—vinyl acetate co-polymers (EVA), ethylene—acrylic ester copolymers, ethylene—α-olefin co-polymers, ethylene—propylene co-polymers, polypropylene (PP), polyethylene (PE), chlorosulfonated polyethylene (CSPE), or polyisobutylene (PIB), and mixtures thereof.

The roofing membrane may be a single ply membrane or a composite membrane consisting of top and bottom layers with different formulation. The top layer may be homogenous or reinforced with a center layer of glass fleece, polyester scrim, or combinations thereof. In addition, the bottom layer may be laminated with non-woven polyester or polypropylene fleece, a foam layer, or the like.

The roofing membrane can have a thickness of 0.1-20.0 mm, preferably 0.5-10.0 mm, more preferably 0.5-5.0 mm, most preferably 0.5-2.5 mm.

The construction of the roofing membrane is not particularly limited in the present invention but the membrane should fulfill the general requirements as defined in DIN 20000-201:2015-08 standard.

The roofing membrane is typically provided in a form of a prefabricated membrane, which is delivered to the construction site and unwound from rolls to provide sheets having a width of 1-5 m and length of several times the width. However, the membrane can also be used in the form of strips having a width of typically 1-20 cm, for example so as to seal joints between two adjacent membranes. Moreover, the membrane can also be provided in the form of planar bodies, which are used for repairing damaged locations in membranes.

It may be advantageous that the polymeric membrane comprises a reinforcement layer. The reinforcement layer contributes to the dimensional stability and strength of the polymeric membrane. This is preferably a fiber material or a mesh, in particular a fiber material. The term "fiber material" refers to a material composed of fibers. The fibers comprise or consist of organic or synthetic material. These are in particular cellulose fibers, cotton fibers, protein fibers, synthetic fibers or inorganic fibers, for example glass fibers. Preferably fibers made of polyester, or made of a homopolymer or copolymer of ethylene and/or propylene, or made of viscose, shall be primarily mentioned as synthetic fibers. The fibers can be short fibers or long fibers, spun, woven or unwoven fibers or filaments. The fibers can moreover be aligned or drawn fibers. Moreover, it can be advantageous to use different fibers, both in terms of geometry and composition, together.

It can also be advantageous if the polymeric membrane comprises a topcoat, which is preferably applied to the planar surface facing away from the layer of adhesive. If the topcoat includes UV absorbers or stabilizers, the topcoat can protect the sealing device from aging by sunlight, for example. The topcoat may include color pigments, to give the roofing membrane the color that is desired by the customers.

The roofing membrane may be produced by any conventional means such as by way of calendaring and/or extrusion.

The substrate to which the roofing membrane is bonded is preferably selected from the group consisting of insulation board, cover board, or an existing membrane.

According to another aspect of the present invention, a fully adhered membrane roofing system obtainable by using the method of the present invention is provided, wherein the system comprises a substrate and a roofing membrane directly or indirectly adhered over at least part of its surface, in particular over its entire surface, to the surface of the substrate with a layer of adhesive. The term "directly adhered" means here that there is no further layer of material between the substrate and the roofing membrane than the layer of adhesive. The term "indirectly adhered" means that the roofing membrane is adhered to another layer, such as a layer of fleece, which is then directly adhered to the surface of the substrate with the layer of adhesive. Preferably, the roofing membrane is directly adhered over at least part of its surface, in particular over its entire surface, to the surface of the substrate with the layer of adhesive.

The fully adhered membrane roofing system comprises a layer of (cured/set) adhesive between the roofing membrane and the substrate. In one or more embodiments, the thickness of the layer of adhesive is 0.1-2.0 mm, preferably 0.1-1.5 mm, most preferably 0.1-1.0 mm. Layers of adhesive having the thickness in in the above cited ranges have been found to provide sufficient peel strengths in fully adhered membrane roofing systems.

Preferably, the layer of adhesive has a water absorbing capacity in the range of 50-500 $g/m^2$, in particular 100-400 $g/m^2$. Even though the superabsorber polymers are generally able to absorb up to the 300 times of their weight of water in a state of free expansion, their water absorbing capacity is significantly decreased while being mixed in the adhesive composition of the present invention. Due to restoring network forces of the dried rubber component, the water absorbing capacity of the superabsorber polymer in the adhesive composition is limited to 20-40 times of the weight of the superabsorber polymer. Fully adhered membrane roofing systems comprising a layer of adhesive having a water absorption capacity in the above cited ranges have been found to provide superior resilience against humidity ageing at elevated temperatures.

According to still another aspect of the present invention, a use of the adhesive composition of the present invention for adhering roofing membranes to a substrate by contact bonding is provided.

EXAMPLES

The followings compounds and products shown in Table 1, were used in the examples:

TABLE 1

| Sarnacol 2170 | Contact adhesive with 20 wt.-% solids | Sika Corporation USA |
|---|---|---|
| Creabloc SIS-TR | Superabsorber in particulate form | Evonik Industries |
| Sarnafil G410-15 | PVC roofing membrane | Sika Corporation USA |

Adhesive Bonding Strength

The adhesive bonding strength and thermal stability of the adhesive bond obtained with the exemplary adhesive compositions was determined based on peel resistance measurements.

For the measurement of peel resistances, test specimens comprising a sheet of Sarnafil G410-15 roofing membrane adhered on the surface of plywood substrate using the exemplary adhesive compositions were produced. The exemplary adhesive compositions were produced by mixing Creabloc SIS-TR superabsorber particles with Sarnacol 2170 contact adhesive in a suitable container with a suitable mixing apparatus.

For the production of a test specimen, plywood substrates having dimensions of 5 cm×30 cm were first evenly covered with approximately ⅔ of the adhesive composition batch using a squeegee and dried for approximately 30 minutes until the adhesive surface was not tacky anymore. Then strips of roofing membrane having dimensions of 5 cm×30 cm were coated with the remaining ⅓ of adhesive composition batch and dried for approximately 3 minutes until the adhesive layer was slightly moist ("stringy" according to finger test). The adhesive layer on the roofing membrane strips was then contacted with the adhesive layer on the substrate, after which the strip and the substrate were pressed together for a time of approximately 5 seconds. Thereafter, the test specimen was stored for one week at room temperature.

The exemplary adhesive compositions were applied on the surface of the ply wood substrates and roofing membrane strips such that the total wet thickness of the adhesive before pressing the strip together with the substrate was 750 $g/m^2$. After storing the test specimen for one week at room temperature the dry thickness of the adhesive layer between the strip and the substrate was 150 $g/m^2$.

The initial peel resistances were measured after storing the test specimen at room temperature for a period of one week with and without increased humidity. In order to determine the effect of prolonged heat and humidity on the adhesive bonding strength, the peel resistances were also measured after storing the test specimen for a period of four weeks at a temperature of 80° C. in an drying oven (heat ageing) and at a temperature of 70° C. at a relative humidity of 100% (humidity ageing). After the ageing periods the test specimen were equilibrated for 24 hours before conducting the peel resistance measurements. The results of the peel resistance measurements and amounts of superabsorber particles contained in the adhesive compositions are shown in Table 1.

Peel Resistance Measurement

The average peel resistances upon peeling the roofing membrane strip from the surface of the plywood substrate was measured using a Zwick tensile testing apparatus equipped with a 90°-peeling device.

In the peel resistance measurement, the edges of the test specimen were first clamped with the grips of the material testing apparatus. Subsequently, the sample strip was peeled off from the surface of the ply wood substrate at a peeling angle of 90° and at a constant cross beam speed of 100 mm/min. The peeling of the sample strip was continued until a length of approximately 20 cm of the strip was peeled off from the surface of the substrate. The average peel resistance was calculated as average peel force per width of the strip [N/50 mm] during peeling over a length of approximately 12 cm thus excluding the first and last fifth of the total peeling length from the calculation.

The average peel resistance values obtained with test specimen according to examples in Table 1 have been calculated as an average of measured values obtained with two test specimen having same adhesive composition coated on the same sheet of roofing membrane. The adhesive composition without superabsorber is presented as reference example.

TABLE 2

Adhesive compositions and measured peel resistances

| Amount of superabsorber | Ageing | Initial @ RT, N/50 mm | After 4 weeks, N/50 mm |
|---|---|---|---|
| 0 g/100 g Sarnacol 2170 (Reference) | @80° C. | 82 | 93 |
| | @70° C., 100% RH | 84 | 87 |
| 2 g/100 g Sarnacol 2170 | @80° C. | 96 | >100 |
| | @70° C., 100% RH | 97 | 89 |

TABLE 2-continued

Adhesive compositions and measured peel resistances

| Amount of superabsorber | Ageing | Initial @ RT, N/50 mm | After 4 weeks, N/50 mm |
|---|---|---|---|
| 4 g/100 g Sarnacol 2170 | @80° C. | 97 | >100 |
|  | @70° C., 100% RH | 81 | 93 |
| 6 g/100 g Sarnacol 2170 | @80° C. | >100 | >100 |
|  | @70° C., 100% RH | >100 | Delamination of the sample*** |

\* RT = room temperature
\*\* RH = relative humidity, %
\*\*\*Due to excessive swelling of the adhesive under humidity ageing

The invention claimed is:

1. An adhesive composition comprising:
   a) at least one rubber component,
   b) at least one organic solvent, wherein the total amount of the organic solvent is 50.0-90.0% by weight based on the total weight of the adhesive composition, and
   c) at least one powdered superabsorber polymer, wherein the total amount of powdered superabsorber polymers is 0.5-10.0% by weight, based on the total weight of the adhesive composition.

2. The adhesive composition according to claim 1, wherein the adhesive composition is a solvent-based solution adhesive, wherein the at least one rubber component is dissolved in the organic solvent.

3. The adhesive composition according to claim 1, wherein the total amount of powdered superabsorber polymers is 1.0-6.0% by weight, based on the total weight of the adhesive composition.

4. The adhesive composition according to claim 1, wherein the total amount of the rubber components is 5.0-60.0% by weight based on the total weight of the adhesive composition.

5. The adhesive composition according to claim 1, wherein the rubber component is selected from the group consisting of chloroprene rubber, butyl rubber, halogenated butyl rubber, acryl nitrile rubber, natural rubber, and mixtures thereof.

6. The adhesive composition according to claim 1, further comprising at least one hydrocarbon resin and/or a synthetic thermosetting resin, and/or adhesion promoter.

7. A method comprising adhering roofing membranes to a substrate by contact bonding with the adhesive composition according to claim 1.

8. The adhesive composition according to claim 1, wherein the total amount of the organic solvent is from 60.0-85.0% by weight, based on the total weight of the adhesive composition.

9. The adhesive composition according to claim 1, wherein the total amount of powdered superabsorber polymers is 2.0-6.0% by weight, based on the total weight of the adhesive composition.

\* \* \* \* \*